Jan. 18, 1966  L. F. PERKINS  3,229,712
LIQUID LEVEL CONTROL SYSTEM
Filed July 2, 1962  2 Sheets-Sheet 1
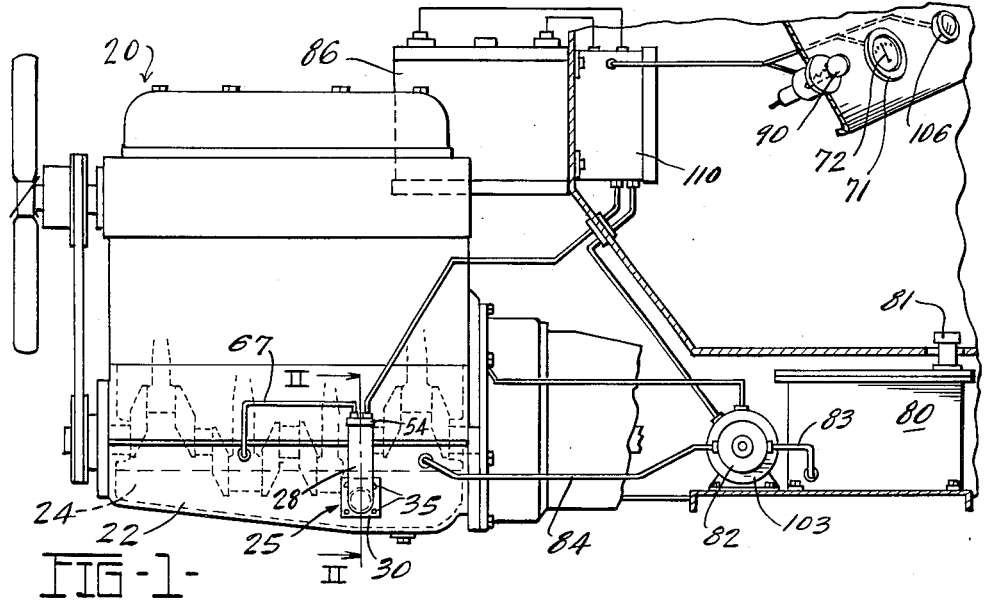
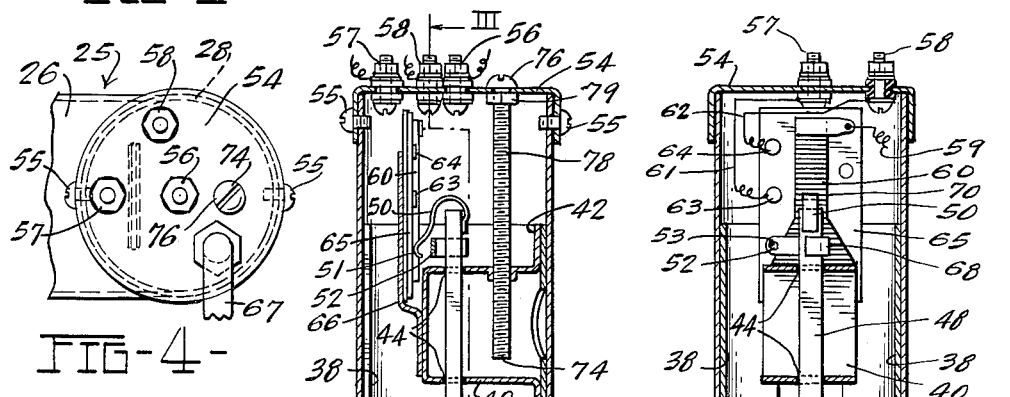
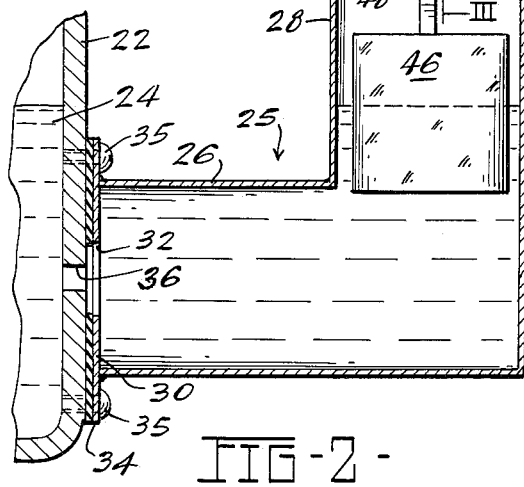
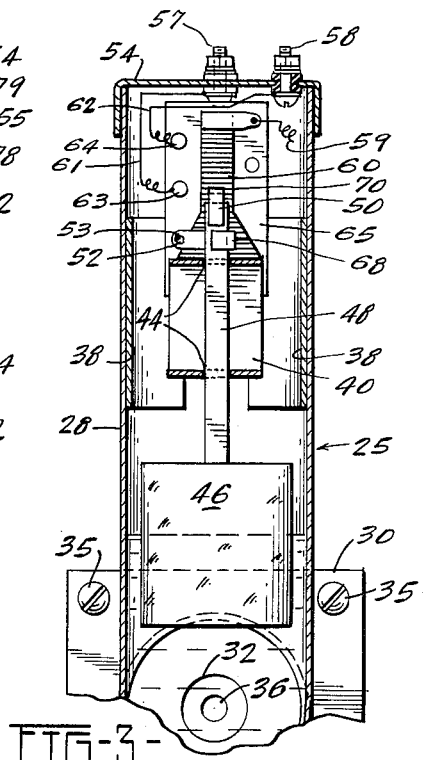
INVENTOR:
LUTHER F. PERKINS.
BY
Hugh A Kirk
ATTY.

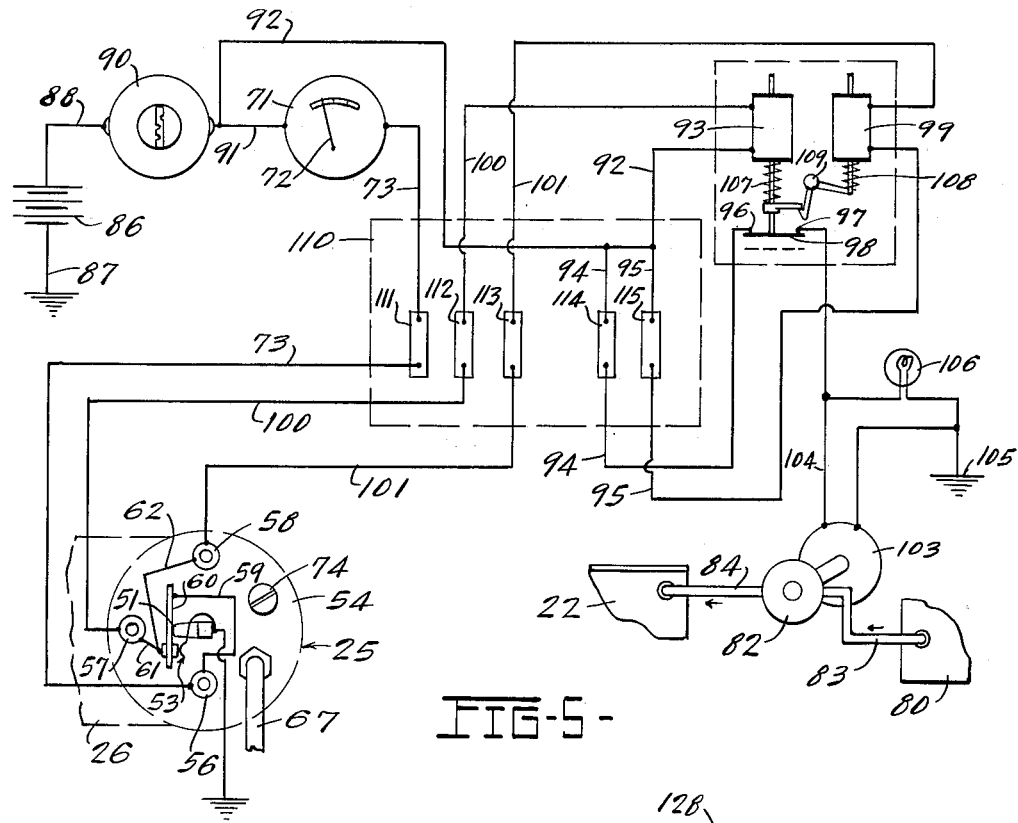

United States Patent Office 3,229,712
Patented Jan. 18, 1966

1

3,229,712
LIQUID LEVEL CONTROL SYSTEM
Luther Fred Perkins, 538 Camp St., Sandusky, Ohio
Filed July 2, 1962, Ser. No. 206,758
3 Claims. (Cl. 137—394)

This invention relates to liquid level control means and is particularly directed to means for maintaining a substantially constant level of liquid in a container or casing.

An object of the invention is to provide improved means for automatically maintaining a normal level of liquid, such as lubricant, in a casing to insure proper operation of the mechanism in the casing.

Another object of the invention is to provide means to automatically supply lubricant to a casing when the level of lubricant therein drops to a predetermined low and to raise the level to normal.

Another object of the invention is to provide an improved means for maintaining the oil level in the crankcase and/or transmission of an internal combustion engine by pumpig oil thereto from a reservoir in response to drop of oil in the crankcase to a predetermined low from normal operating level.

Another object of the invention is to provide control means which will actuate means to indicate the level of oil in a casing and initiate the operation of means to maintain such level between predetermined limits.

A further object of the invention is to provide float operated means for controlling oil level indicating means and/or the actuation of means to maintain a normal operating level of oil in an engine crankcase and/or transmission during operation of the engine, particularly of a truck, bus or the like having an expensive engine which can easily be damaged quickly by lack of proper lubrication even for a short time.

Generally speaking, the invention comprises float operated electrical circuit controlling means including an L-shaped tube having a horizontal portion in communication with liquid in a casing and a vertical portion having a body of liquid the surface of which is coplanar with the means surface of liquid in the casing, a float supported by the liquid in the vertical tube portion having a stem provided with contact means movable in response to variations in liquid level to engage fixed contact means mounted by the vertical tube portion and electrically connected to solenoid means for making and breaking the circuit to a motor driven pump having an inlet connected to a reservoir and an outlet connected to the casing. A manual switch controls the energization of the circuit, which switch may be the ignition switch of an internal combustion engine.

The above mentioned and other features and objects of this invention and the manner of attaining them will become more apparent and the invention itself will be best understood by reference to the following description of embodiments of the invention taken in conjunction with the accompanying drawings, wherein:

FIG. 1 is a fragmentary side elevation of an internal combustion engine in a vehicle and illustrating somewhat diagrammatically a form of the invention incorporated therewith;

FIG. 2 is an enlarged vertical sectional detail view taken substantially on a line II—II of FIG. 1 illustrating the float operated switch means;

FIG. 3 is a sectional detail view taken substantially on a line III—III of FIG. 2;

FIG. 4 is a fragmentary top plan view of the structure shown in FIG. 2;

FIG. 5 is a diagram of the electrical circuit for controlling the system of FIG. 1 and shows schematically the devices incorporated therein;

FIG. 6 is a view similar to FIG. 3 showing a modified control unit for installations in which liquid level gauges are not used; and FIG. 7 is a sectional detail view of a solenoid operated pump that can be used in place of the pump shown in FIGS. 1 and 5.

The drawings illustrate the present invention as incorporated for use with the internal combustion engine of an automotive vehicle. It has utility, however, in mechanisms requiring a liquid, such as lubricating or other oil, for their proper operation.

An internal combustion engine 20 has a crankcase or oil pan 22 for holding a supply of lubricating oil 24 to insure proper and efficient operation of the engine 20. Means are provided by the present invention to not only indicate the level of oil in the crankcase 22, but also to maintain a safe operating level therein by automatically supplying fresh lubricant when required. To accomplish this, a control unit is provided in the form of a tubular L-shaped element 25 having a minor horizontal extension 26 in connection with a vertical major chamber providing portion 28. The minor extension 26 may be attached as by welding to a mounting plate 30, which plate is provided with an axial aperture 32 therethrough, and a flange 34 serving as means such as by screws 35 for attaching said unit 25 to the side of the oil pan 22, which pan is in turn provided with an aperture 36 of reduced diameter therethrough in register with said aperture 32.

Thus oil from the pan 22 will flow into the unit 25 until the level of oil in the vertical chamber or major tube 28 is co-planar with the oil in the pan 22, and due to the restricting aperture 36, any turbulences or wave action within the oil in the chamber 28 is eliminated, regardless of disturbing features which may affect the oil in the pan 22, so that the gauging of the oil in the tube or chamber 28 will accurately reflect the level of the oil in the pan 22.

Frictionally held within the chamber 28, intermediate its length, is a split ring support 38, which is vertically adjustable within such chamber, as hereinafter described. This ring 38 may be provided with a horizontally extending U-shaped bracket 40 having a pair of oppositely extending fingers 42 secured to the ring, as by welding. The substantially parallel legs of this U-shaped bracket 40 are each provided with an aperture 44, thereby providing a pair of aligned bearings.

A float 46 is disposed within the chamber 28 which rises and falls with the level of the oil therein. This float has a square stem 48 upwardly extending therefrom through correspondingly square apertures 44, which serve as bearings therefor and maintain the float in a non-rotary coaxial alignment within the chamber 28. The end of the stem 48 remote from the float 46 mounts a first spring finger 50 and a second spring finger 52 adjacent thereto, so as to move in a path parallel to spring finger 50.

A cap 54 covers the upper end of chamber 28 and may be attached thereto by means such as screws 55. In addition to closing the chamber 28, cap 54 serves as a terminal support or head for a plurality of electrical terminals 56, 57 and 58, each of which extends through the cap and is insulated therefrom. The terminal 56 has a lead 59 extending to a resistance 60 while terminals 57 and 58 have leads 61 and 62 connected to vertically spaced conctancts 63 and 64, respectively, which contacts, as well as resistance 60, are mounted on an insulating plate 65 carried by upright bracket 66 fixed to U-shaped bracket 40. Plate 65 is positioned to apply sufficient tension on spring fingers 50 and 52 so that contacts 51 and 53 thereon will positively engage resistance 60 and fixed contacts 63 and 64 resulting from axial movement of float 46. Cap 54 also may mount one end of a vent tube 67, the other end of which is connected into the crankcase 22 near its top, to vent chamber 28.

A preferred form of resistance 60 is shown in FIG. 3 as having an upwardly tapered shaped base 68 continuing into a rectangular extension 70. Any axial movement of the float 46 causes the contact 51 on finger 50 to slide along the face of the resistance 60, thereby varying the current flow to ground. The variance is translated by the gauge 71 into positioning the pointer 72 in its indicating position. The shape of the resistance increases the nicety of readings, particularly in the lower oil levels.

Adjustments or corrections may be made in the control circuit by raising or lowering the plate 65 within the chamber 28. To this end a screw 74 is carried by the cap 54 having its slotted head 76 exposed thereon and having its shank 78 extending downwardly within the chamber to threadedly engage the bracket 40. Rotation of the screw 74 causes the bracket 40 and the plate 65 to be shifted vertically within the chamber 28. Collar 79 about the shank 78 abutting the under side of the cap 54 maintains the screw against any axial shifting thereof. To adjust the resistance 60 and contacts 63 and 64 it is only necessary to rotate the screw 74 from the exterior of the cap 54 to thereby adjust the position of the resistance body 60 with respect to the finger 50, and the contacts 63 and 64 with respect to finger 52. This eliminates any necessity of seeking access to the unit interior, which defeats any invitation to tamper with the mechanism, and protects against possible contamination.

The apparatus is further inclusive of a reservoir or tank 80, which may be mounted adjacent a pump 82 and have its inlet connected by means of pipe 83 to the reservoir 80. The outlet of pump 82 is in turn connected by pipe 84 to crankcase 22, preferably as shown, closely adjacent the top thereof to supply oil thereto above the normal operating level of the oil in the crankcase.

Referring to the electrical control wiring diagram in FIG. 5, a source of electric energy is provided such as battery 86, having one terminal connected by cable 87 to ground. The other terminal is connected through lead 88 to switch 90, which may be an ignition switch for the engine 20. From switch 90 is a lead 91 connected to the oil level gauge 71 in turn connected to terminal 56 on cap or head 54 by a lead 73. A second lead 92 from switch 90 runs to one end of a solenoid coil 93. A pair of branch wires 94 and 95 connect lead 92 to one contact 96 of solenoid operated switch 98 and to one end of a second solenoid coil 99, respectively. The other end of solenoid coil 93 is connected to terminal 57 on cap 54 by lead 100 while the other end of solenoid coil 99 is connected to terminal 58 by lead 101. Contact 97 of switch 98 is connected to the pump driving motor 103 through lead 104, and motor 103 is in turn grounded at 105. In series with motor 103, a signal light filament 106 may be provided to indicate the operation of motor 103. Coils 93 and 99 are provided with spring urged armatures 107 and 108 respectively, which armatures may be inter-connected by latch means 109 capable of holding switch 98 closed against the action of its spring upon its being initially closed by solenoid coil 93 acting on armature 107. Attraction of armature 108 by solenoid coil 99 releases its spring urged latch 109 to open switch 98.

When switch 90 is closed, current will flow through lead 91 to gauge 71 and from gauge 71 to terminal 56 through lead 73. This portion of the circuit is completed to ground through resistance 60, spring finger 50, float stem 48, bracket 40 and screw 35 to crankcase 22. The pointer 72 of gauge 71 will vary with the changes in liquid level in the crankcase 22. Current will also flow from switch 90 through lead 92 to solenoid coil 93 and leads 94 and 95 to contact 96 and coil 99. If the liquid level in crankcase 22 is at a predetermined low, namely so that float 46 positions contact 53 on finger 52 in engagement with contact 63, a circuit is completed through terminal 57 and lead 100 to the coil 93 to energize this coil 93 and move its armature 107 to close switch 98 where it is held by latch 109. Current will then flow out through lead 104 to operate pump 82 to pump liquid from reservoir 80 to crankcase 22 until the level is restored to normal and float 46 raises finger 52 so that its contact 53 engages stationary contact 64 to complete the circuit to coil 99, attracting armature 108 to release the latch 109 and permit switch 98 to open by the action of its spring around its armature 107.

To facilitate installation of the system and particularly the electrical circuitry, a box 110 may be provided in which a plurality of terminal connectors 111 through 115 are provided. Also, if desired, the solenoids 93 and 99, as well as switch 98, may be located in box 110 to reduce external wiring to a minimum.

In FIG. 6 is shown a modified arrangement suitable for installations which do not require the use of an oil level gauge 71 and its control means such as the resistance 60. Thus, the insulating plate 65 mounts only spaced contacts 63 and 64, and the upper end of float stem 48 carries but one spring finger 52. Accordingly, that portion of the circuit of FIG. 5 which is used for the energization of the gauge 71 may be eliminated.

Other types of electrically driven or operated means than the pump 82, as for example, pump 120 shown in FIG. 7 may be utilized to pump liquid from reservoir 80 to casing 22. Pump 120 may be of the diaphragm or bellows type and provided with a coil 122 within which is a movable armature 124 operably connected to a bellows 125. Reciprocation of armature 124 causes bellows 125 to pulsate, which action draws fluid from reservoir 80 and pipe 83 through inlet valve 126 and forces such fluid through an outlet valve 128 into pipe 84 leading to casing 22. Energy supplied to coil 122 by lead 104 moves armature 124 against action of spring 129 to open switch 130, breaking circuit to ground 105 and temporarily de-energizing coil 122 until spring 129 moves armature 124 to permit switch 130 to again close.

While there is described above the principles of this invention in connection with specific apparatus, it is to be clearly understood that this description is made only by way of example and not as a limitation to the scope of this invention.

What is claimed is:
1. A liquid level control device comprising:
 (a) a container for maintaining even a turbulent liquid between two predetermined levels, said container including a bottom with sides extending upwardly therefrom and provided with an opening through one of said sides below the lower level of said two levels, said opening having a size to allow restricted flow of liquid therethrough,
 (b) a reservoir for liquid,
 (c) an L-shaped tube including a minor horizontally disposed portion in communication with said opening and a major vertical portion whereby liquid from said container will maintain a body of liquid in said major tube portion with a surface co-planar with the mean surface of liquid in said container,
 (d) a bracket adjustably mounted in said major vertical portion, a fixed insulator fixed to said bracket,
 (e) an upper and a lower contact vertically spaced relatively to each other and carried by said insulator,
 (f) a float on the liquid in said major tube portion, said float having a stem slidably mounted in said bracket,
 (g) a movable contact mounted on said stem, said float controlling the position of said movable contact with respect to said upper and lower contacts,
 (h) an electric pump having an inlet communicating with said reservoir, and an outlet communicating with said container,
 (i) a first electrical circuit for energizing said pump, including a manual switch and a second biased-open switch, said lower contact on said insulator for engaging said contact on said stem, a first solenoid for energizing said second switch to closed position and a latch means for holding said second switch closed on subsequent de-energization of said solenoid, and (j) a second electrical circuit for releasing said latch, including said upper contact on said insulator for engaging said contact on said stem and a second solenoid to be energized for releasing said latch.

2. An apparatus according to claim 1 and further including a gauge for indicating the level of oil in said container, additional electrical contact means adjacent said stem electrically connected to said gauge, and a second movable contact on said float stem for operating said additional electrical contact means.

3. An apparatus according to claim 1 and further including means for indicating when said pump is operating.

References Cited by the Examiner
UNITED STATES PATENTS

| | | | |
|---|---|---|---|
| 1,380,359 | 6/1921 | Cooper | 200—84 |
| 1,820,981 | 9/1931 | Le Fever | 137—394 XR |
| 2,548,241 | 4/1951 | Reynolds | 137—392 XR |
| 2,672,880 | 3/1954 | Hermanson | 137—394 XR |
| 2,790,459 | 4/1957 | Thomas | 137—412 |
| 2,835,270 | 5/1958 | York | 137—412 |
| 2,863,472 | 12/1958 | Coles et al. | 137—394 XR |
| 2,905,783 | 9/1959 | Johnson | 103—26 XR |
| 2,907,844 | 10/1959 | Lindsey | 200—84 |

MARTIN P. SCHWADRON, *Acting Primary Examiner.*

M. CARY NELSON, WILLIAM F. O'DEA, *Examiners.*